UNITED STATES PATENT OFFICE.

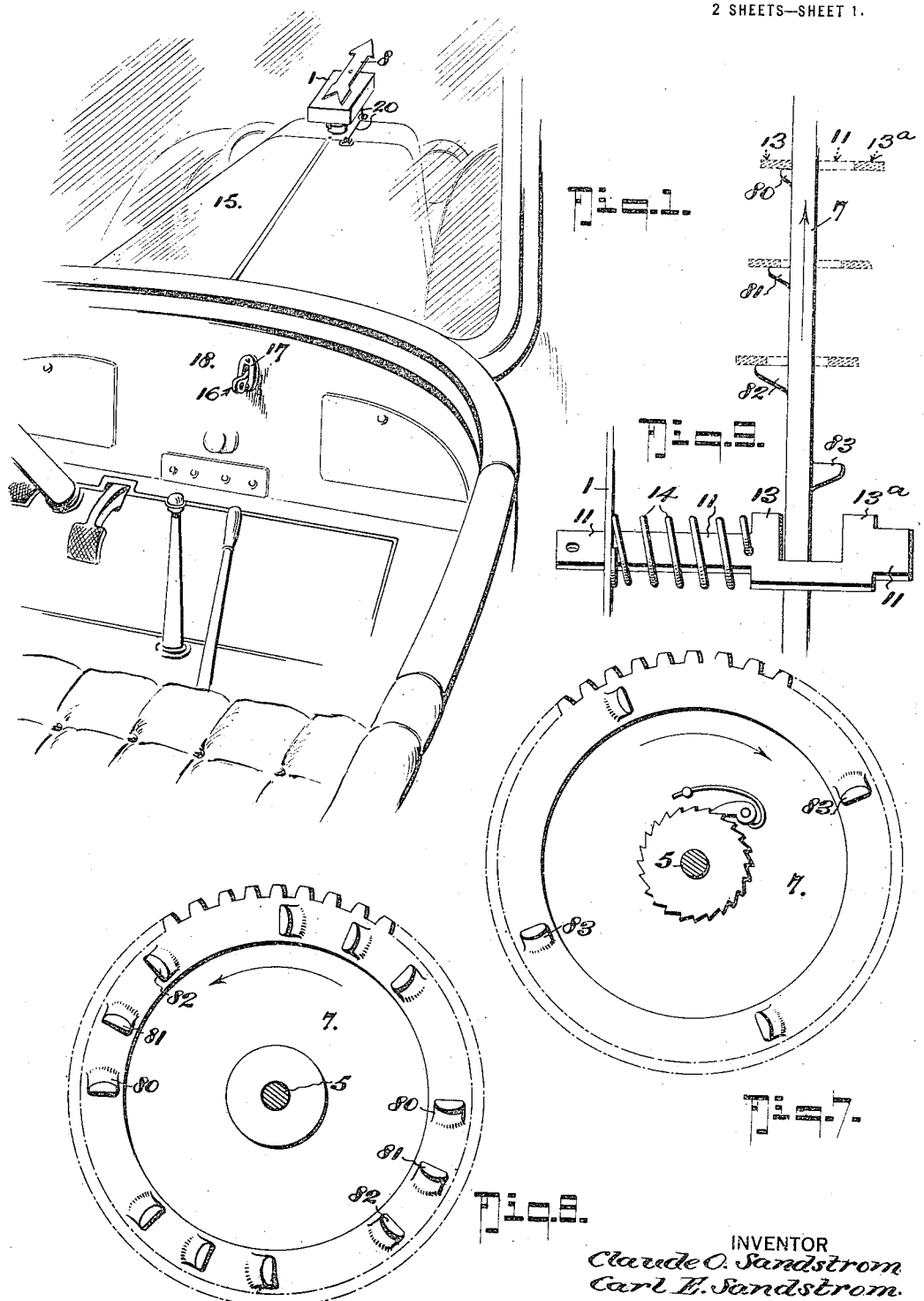

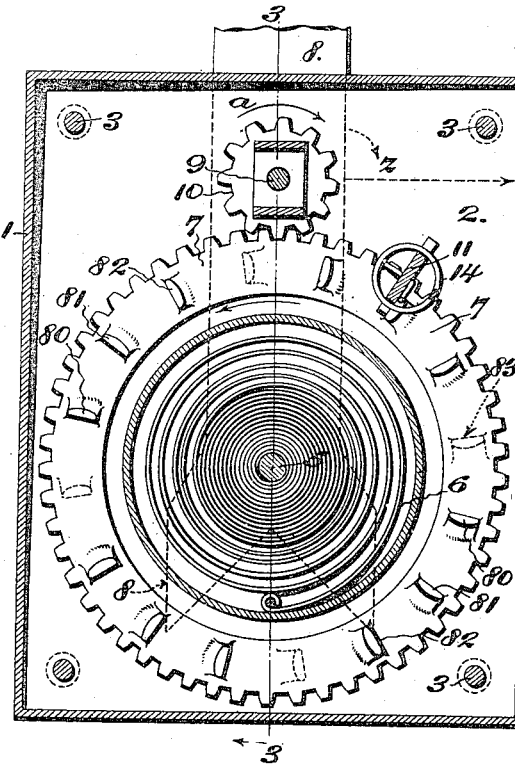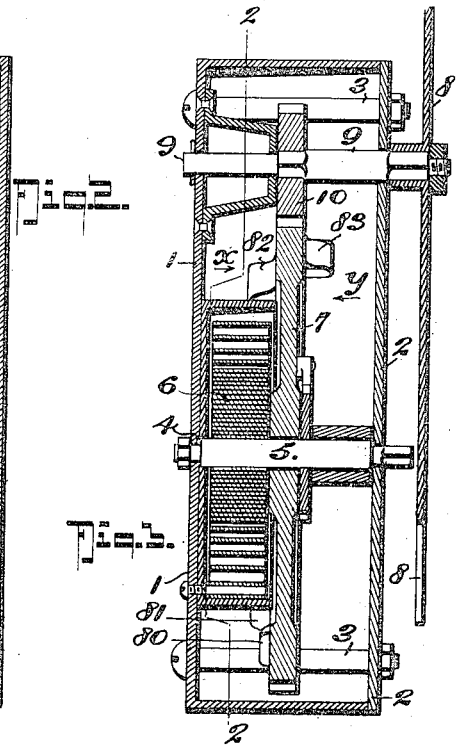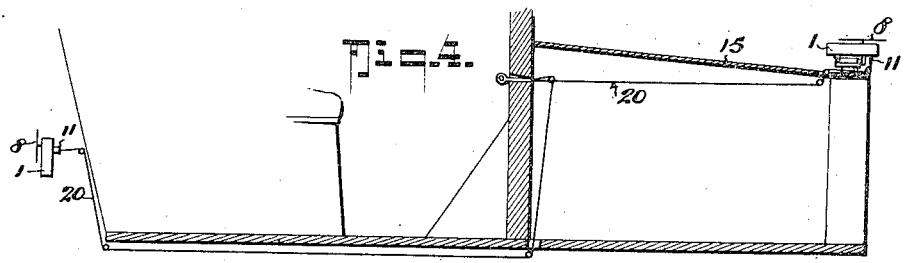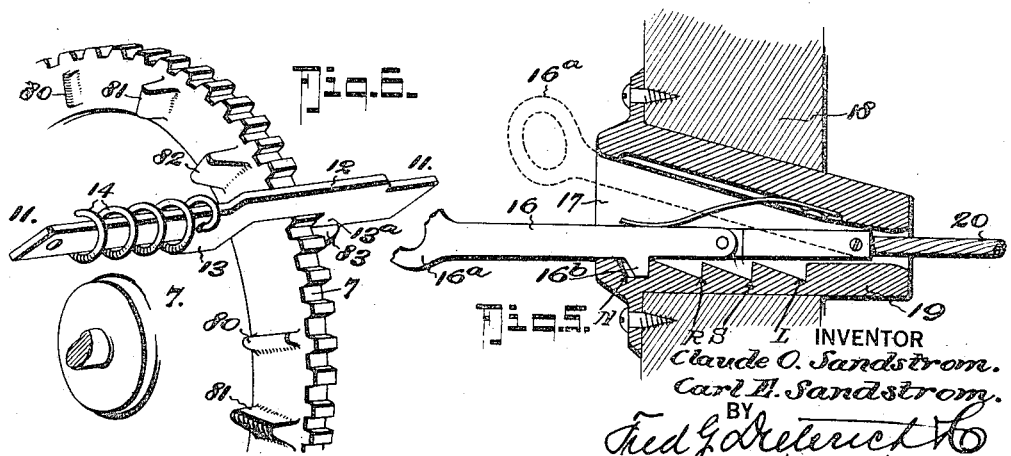

CLAUDE O. SANDSTROM AND CARL E. SANDSTROM, OF INDIANAPOLIS, INDIANA.

DIRECTION-INDICATOR.

1,252,724. Specification of Letters Patent. Patented Jan. 8, 1918.

Application filed February 14, 1917. Serial No. 148,570.

*To all whom it may concern:*

Be it known that we, CLAUDE O. SANDSTROM and CARL E. SANDSTROM, both of Indianapolis, in the county of Marion and State of Indiana, have invented a new and Improved Direction-Indicator, of which the following is a specification.

Our invention relates to improvements in that class of indicator devices more especially designed for indicating the direction to which a vehicle is about to turn and in which is included means operable from the dash or instrument board of the motor vehicle for controlling the adjustment of the indicator mechanism for setting the indicating member to the left, right, neutral, or stop positions.

Primarily, the object of our invention is to provide a comparatively simple and inexpensive direction indicator means that can be readily applied to the ordinary types of motor vehicles for indicating, at each end of the vehicle, the direction that the said vehicle is to take and the said means is so designed whereby the drivers of vehicles approaching from either end or from the side, may be readily signaled the direction that the vehicle is to take or will continue to run.

Another object of our invention, is to provide a direction indicator mechanism of the general character stated, in which the operation of setting the indicating element is effected clockwise and the operating mechanism is such, that the said element is successively moved, under proper operations of a controlling means operable by the vehicle driver, from neutral to right, stop, left and back to neutral as conditions may demand, the said controlling means being adapted for simultaneously actuating the indicator devices at each end of the vehicle.

With other objects in view, that will hereinafter appear, our invention is an improved direction indicator mechanism for motor vehicles that embodies the peculiar features of construction and novel arrangement of the parts as stated in the following description, specifically pointed out in the appended claims and illustrated in the accompanying drawings, in which:

Figure 1 is a perspective view of so much of a motor vehicle as is necessary to illustrate the operative application of our improved direction indicator devices.

Fig. 2 is a rear elevation of the clockwise operating mechanism for turning the indicator or pointing arm, parts of the casing in which the said mechanism is contained being in section, the section being on the line 2—2 on Fig. 3.

Fig. 3 is a transverse section of the said mechanism taken on the line 3—3 on Fig. 2.

Fig. 4 is a diagrammatic longitudinal section of a motor vehicle body and shows one way of mounting an indicator mechanism at each end thereof, and a controlling means operated from the instrument or dash board.

Fig. 5 is a diagrammatic section of one way of controlling the device from the dash board, hereinafter specifically referred to.

Fig. 6 is a detail perspective view of a portion of the main clock works gear and the coöperating stop control yoke.

Fig. 7 is a face view of the said main gear, looking at the face having the "neutral" stops, see arrow *y*, Fig. 3.

Fig. 8 is a face view of the said main gear looking at that face provided with the multiple sets of "right," "stop" and "left" stop lugs, see arrow *x* on Fig. 3.

Fig. 9 is a diagrammatic plan of the movable yoke shaped control lever, hereinafter referred to.

In the drawings we have shown the motor vehicle as equipped with one of our indicator mechanisms at each end thereof and the front one as mounted on the radiator cap, and the control devices connected for actuating the two mechanisms in unison but, we desire it understood that the said front and rear indicator devices may be otherwise mounted on the vehicle body and actuated by separate controls, operable by the occupant of the vehicle.

The indicator mechanisms or devices, the construction of which is best shown in Figs. 2, 3, 7 and 8 consist essentially, of a suitable casing 1 that includes a removable back 2 attached to the main part of the casing by four cross bolts 3 and the said back has a bearing aperture 4 for one end of the clock spring carrying shaft 5 to which is connected, one end of the clock spring 6 whose other end is fastened to, what we term, the main clock gear 7, loosely mounted on the shaft 5 and which carries the stops that control the movement of the indicator arm or pointing arrow 8, and whose peculiar construction and coöperation with a peculiar type of stop lever forms the essential feature of our invention.

The indicator arm 8 is keyed on the outer end of the cross shaft 9, mounted in the top of the casing 1 and to this shaft is connected a cog pinion 10 that meshes with the main cog 7 that is held under tension of the spring 6 to turn clockwise in the direction indicated by the arrow *a* on Fig. 2.

At this point, it should be stated, that in the practical application of our invention, we make the main gear 7 of a diameter four times that of the pinion 10 so that each quarter revolution of the gear 7 imparts a complete revolution to the shaft 9 and the indicator arm 8.

Another object for making the main gear 7 and the pinion 10 of the two diameters stated, is, that it provides for four complete movements of the arm 8 during each revolution of the gear 7, or in other words, the indicator arm 8, during each complete rotation of the shaft 9, assumes the following indicating positions: "neutral" when the car is running straight ahead; "right," "stop" and "left"; thus the said sets of movements are repeated four times during each complete turn of the main gear 7, it being understood that each progressive partial turn of the main gear 7 to turn the indicator arm to the position desired, the said gear 7 is held to such movement by stop mechanism, which I shall now describe.

As is clearly shown in Fig. 2, one face of the main wheel 7 is provided with four sets of stop lugs, each set consisting of three stops 80, 81 and 82 spaced equidistantly apart and each set is spaced apart from the adjacent set of stops a distance equal to two stop spaces.

The several stops 80, 81 and 82 as best shown in Figs. 8 and 9 are in the nature of beveled lugs that project from the face of the main gear wheel 7, the stop 80 of each set being the shortest and hereinafter designated the "left" stop; stop 81 being somewhat longer than the stop 80 and hereinafter termed the "stop" lug; and the lug 82 the longest and hereinafter termed the "right" stop.

On the opposite face, the gear wheel 7 has four lugs 83 of uniform length projected laterally therefrom and these lugs are arranged in quarters and are located centrally of each adjacent pair of stops of the set of stop lugs 80, 81 and 82, as indicated in dotted lines on Fig. 2, and the said stops 83 are hereinafter termed the "neutral" stops.

The main gear 7 is normally held from turning under the main spring tension by a control lever 11 that includes a yoke shaped member 12 which bridges over the peripheral edge of the gear 7 with the opposite side portions 13—13ª projected radially inward a distance sufficient to locate in the path of movement of the stop lugs on both sides of the gear 7 under proper adjustment of the said lever 11.

Lever 11 moves in the plane at right angles to the gears 7 and 11 and it is normally held, under tension of a spring 14, see Figs. 6 and 9, with its yoke portion 13 in the path of movement of the stops 80, 81 and 82, the opposite portion 13ª of the lever yoke being spaced apart from the portion 13 such distance that the lever 11 must be pulled back sufficiently so its portion 13 clears all of the lugs 80, 81 and 82 on the adjacent face of the gear 7 before the portion 13ª comes into position for engagement with the "neutral" stops on the other face of the said gear 7, the reason for which will presently appear.

It is understood that control devices, operable from the instrument or dash board of the vehicle, are coöperatively joined with the slidable lever 11 that is held for movement in one direction by the spring 14.

In the drawings, we have indicated a flexible pull cable or cord 20 that connects with the said lever 11, passes under the hood 15 and connects with a pull lever, which may be of the construction shown in detail in Fig. 5, from which it will be observed that the lever includes a member 16 slidable in a guide way 17 on the dash 18, a handle 16ª pivotally connected to the member 16 and formed with a lug 16ᵇ for engaging with any one of a series of ratchet notches designated N, R, S and L in a plate 19.

It is to be understood that we do not limit ourselves to the use of a control means such as shown and described as located on the dash, since the said form of means is indicated merely for the purpose of illustrating the manner in which our indicator devices may be conveniently operated by the occupant of the vehicle and held to the desired adjustments.

From the foregoing description taken in connection with the drawings, the complete construction and the advantages of our invention will be apparent to those skilled in the art to which the said invention relates.

By reason of the parts being constructed and coöperatively combined, as shown and explained, the operation of shifting the indicator arm or arrow may be quickly and effectively accomplished.

Assuming the indicator arm to be at the position indicating "Stop", as shown in Figs. 1 and 2, and the operator desires to indicate a turn to the right, the lever 11 is pulled back so its yoke portion 13 disengages stop lug 81 and as the wheel 7 turns counter clockwise, stop 82 will next come into engagement with the lever portion 13 and hold the wheel 7 from further rotation, it being understood that gear 10 has now received a quarter clockwise turn and the arm 8 turned to the right, as indicated by the broken lines *z* on Fig. 2.

Assuming the arm to be extended at the right position, to turn the said arm to the left position, the lever 11 is pulled to its outermost limit to disengage the "right" stop 82, which brings the lever portion 13ª in the path of a neutral lug 83 on the other side, which is escaped by releasing the lever 11 to allow the spring 14 to turn the said lever to a first position with its portion 13 located for being engaged by the next or "left" stop 80.

What we claim is:

1. Direction indicating mechanism for moving vehicles, said mechanism embodying a pivotally mounted indicator arm, clock spring actuated devices for imparting intermittent counter-clockwise movements to the said arm, stops included in the said devices for holding the arm at its different points of rotation and means for releasing the stops operable from the motor vehicle.

2. Direction indicating mechanism for moving vehicles, embodying a pivotally mounted indicator arm, a spring actuated gear for imparting intermittent uni-directional movements to the said arm, the said gear mechanism including a main gear, stops arbitrarily arranged on the said gear for holding the indicating arm at neutral, left, stop and right positions, a control device for coöperating with the said stops and means for shifting the control device to release the main gear with the stops, whereby to bring the predetermined ones of the stops in position for being engaged by the control device.

3. In a direction indicating means, a housing, a main gear mounted in the housing, a spring connected therewith tending to continually turn the gear, a cross shaft journaled in the housing, a gear fixed thereon that meshes with the main gear, an indicating arm secured to the said cross shaft, the said main and cross shaft gears being of four to one diameter, means for intermittently releasing the main wheel for rotating the indicating arm carrying shaft a quarter turn, stops projected from the faces of the main wheel for limiting the intermittent movements of the said wheel and control devices for coacting with the stop and means operable from the vehicle body for setting the control devices for being engaged by predetermined ones of the stop devices on the main wheel.

4. Direction indicating means, embodying therein, a housing, a shaft journaled in the housing, a visual indicating arm mounted on the said shaft, a clock spring actuated gearing located in the housing, the said gearing including a main gear operating under the spring tension and a rotatable gear secured to the visual arm carrying shaft, said gear and the main gear being of one to four diameters, arbitrarily arranged stop lugs on the main gear that control the length of the intermittent movements of the main gear, whereby each movement of the main gear imparts a quarter turn to the visual arm, a control device including a shiftable stop for progressively releasing and engaging the stop lugs on the main gear, and means for imparting shiftable movements to the said shiftable stop in one direction and means tending to automatically move the shiftable stop in the other direction.

5. In a direction indicating means, the combination with a housing, a main and a smaller gear mounted therein, the smaller gear and the main gear being of relatively one to four diameters, a visual indicator arm mounted on the shaft of the smaller gear, a series of sets of stop lugs of progressively increasing lengths, projected from one side of the main gear, a series of stop lugs of uniform lengths projected from the other side face of the main gear for limiting the intermittent movements of the said gear, and control devices that coact with the stops and means operable from the vehicle body for setting the control devices for being engaged by the predetermined ones of the stop devices on the main gear.

CLAUDE O. SANDSTROM.
CARL E. SANDSTROM.

Copies of this patent may be obtained for five cents each, by addressing the "Commissioner of Patents, Washington, D. C."